US011003692B2

(12) United States Patent
Gong et al.

(10) Patent No.: US 11,003,692 B2
(45) Date of Patent: May 11, 2021

(54) SYSTEMS AND METHODS FOR ONLINE CLUSTERING OF CONTENT ITEMS

(71) Applicant: Facebook, Inc., Menlo Park, CA (US)

(72) Inventors: Yunchao Gong, Sunnyvale, CA (US); Marcin Pawlowski, Mountain View, CA (US); Fei Yang, Fremont, CA (US); Lubomir Bourdev, Mountain View, CA (US); Louis Dominic Brandy, Sunnyvale, CA (US); Robert D. Fergus, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 807 days.

(21) Appl. No.: 14/980,572

(22) Filed: Dec. 28, 2015

(65) Prior Publication Data
US 2017/0185665 A1 Jun. 29, 2017

(51) Int. Cl.
*G06F 16/28* (2019.01)
*H04L 29/08* (2006.01)
*G06N 20/00* (2019.01)
*G06F 16/901* (2019.01)

(52) U.S. Cl.
CPC ........ *G06F 16/285* (2019.01); *G06F 16/9024* (2019.01); *G06N 20/00* (2019.01); *H04L 67/10* (2013.01); *H04L 67/1097* (2013.01)

(58) Field of Classification Search
CPC ......... G06F 17/30598; G06F 17/30958; G06F 16/285; G06F 16/9024; G06N 20/00; H04L 67/10
USPC ...................................................... 707/737
See application file for complete search history.

(56) References Cited

U.S. PATENT DOCUMENTS

| 8,010,534 | B2* | 8/2011 | Roitblat | G06F 16/35 |
| | | | | 707/742 |
| 8,983,941 | B1* | 3/2015 | Murphy-Chutorian | |
| | | | | G06K 9/46 |
| | | | | 707/723 |
| 9,177,225 | B1* | 11/2015 | Cordova-Diba | G06T 5/00 |
| 9,628,344 | B2* | 4/2017 | Newton | H04L 41/0893 |
| 2005/0060643 | A1* | 3/2005 | Glass | G06F 17/241 |
| | | | | 715/205 |
| 2007/0033214 | A1* | 2/2007 | Lewis | G06F 3/04817 |
| 2008/0270729 | A1* | 10/2008 | Reddy | G06F 17/30598 |
| | | | | 711/170 |
| 2010/0011071 | A1* | 1/2010 | Zheleva | G06F 21/55 |
| | | | | 709/206 |

(Continued)

OTHER PUBLICATIONS

Ge, Tiezheng et al., "Optimized Product Quantization," IEEE Transactions on Pattern Analysis and Machine Intelligence, vol. 36, No. 4, pp. 744-755, Apr. 2014.

(Continued)

*Primary Examiner* — Mohammad S Rostami
*Assistant Examiner* — Saba Ahmed
(74) *Attorney, Agent, or Firm* — Sheppard Mullin Richter & Hampton LLP

(57) ABSTRACT

Systems, methods, and non-transitory computer-readable media can obtain a first batch of content items to be clustered. A set of clusters can be generated by clustering respective binary hash codes for each content item in the first batch, wherein content items included in a cluster are visually similar to one another. A next batch of content items to be clustered can be obtained. One or more respective binary hash codes for the content items in the next batch can be assigned to a cluster in the set of clusters.

20 Claims, 8 Drawing Sheets

Content Items    Binary Hash Codes    Binary Cluster Centers

(56) References Cited

U.S. PATENT DOCUMENTS

| | | | | |
|---|---|---|---|---|
| 2011/0137916 | A1* | 6/2011 | Deen | G06F 16/178 707/747 |
| 2011/0196869 | A1* | 8/2011 | Patterson | G06F 17/30312 707/737 |
| 2013/0103655 | A1* | 4/2013 | Fanghaenel | G06F 17/30336 707/693 |
| 2014/0196037 | A1* | 7/2014 | Gopalan | G06F 9/4856 718/1 |
| 2014/0330785 | A1* | 11/2014 | Isherwood | G06F 11/1446 707/640 |
| 2014/0344425 | A1* | 11/2014 | Varney | H04L 41/0813 709/221 |
| 2016/0048849 | A1* | 2/2016 | Shiftan | G06Q 30/0241 705/7.29 |
| 2016/0267179 | A1* | 9/2016 | Mei | G06F 16/7328 |

OTHER PUBLICATIONS

Gong, Yunchao et al., "Iterative Quantization: A Procrustean Approach to Learning Binary Codes for Large-Scale Image Retrieval," IEEE Transactions on Pattern Analysis and Machine Intelligence, vol. 35, No. 12, pp. 2916-2929, Dec. 2013.

He, Kaiming et al., "K-means Hashing: An Affinity-Preserving Quantization Method for Learning Binary Compact Codes," Proceedings of the 2013 IEEE Conference on Computer Vision and Pattern Recognition, pp. 2938-2945, Jun. 2013.

Jegou, Nerve et al., "Product Quantization for Nearest Neighbor Search," IEEE Transactions on Pattern Analysis and Machine Intelligence, vol. 33, No. 1, pp. 117-128, Mar. 2010.

Liu, Wei et al., "Hashing with Graphs," Proceedings of the 28th International Conference on Machine Learning, pp. 1-8, Jun. 2011.

Liu, Wei et al., "Supervised Hashing with Kernels," Proceedings of the 2012 IEEE Conference on Computer Vision and Pattern Recognition, pp. 2074-2081, Jun. 2012.

Norouzi, Mohammad et al., "Cartesian K-means," Proceedings of the 2013 IEEE Conference on Computer Vision and Pattern Recognition, pp. 3017-3024, Jun. 2013.

Norouzi, Mohammad et al., "Fast Search in Hamming Space with Multi-Index Flashing," Proceedings of the 2012 IEEE Conference on Computer Vision and Pattern Recognition, pp. 3108-3115, Jun. 2012.

Norouzi, Mohammad et al., "Minimal Loss Hashing for Compact Binary Codes," Proceedings of the 28th International Conference on Machine Learning, pp. 353-360, Jun. 2011.

Wang, Jun et al., "Semi-Supervised Hashing for Scalable Image Retrieval," Proceedings of the 2010 IEEE Conference on Computer Vision and Pattern Recognition, pp. 3424-3431, Jun. 2010.

Weiss, Yair et al., "Spectral Hashing," Advances in Neural Information Processing 21, Dec. 2008.

* cited by examiner

SYSTEMS AND METHODS FOR ONLINE CLUSTERING OF CONTENT ITEMS

FIELD OF THE INVENTION

The present technology relates to the field of machine learning. More particularly, the present technology relates to techniques for online clustering of a stream of content items.

BACKGROUND

Today, people often utilize computing devices (or systems) for a wide variety of purposes. Users can use their computing devices to, for example, interact with one another, create content, share information, and access information. In some instances, computing devices can be used to cluster content items, such as digital photographs or videos, using various clustering algorithms.

Under conventional approaches, various techniques to clustering can be applied to collections of content items (e.g., images) in an effort to organize such content items, for example, based on their similarity to one another. For example, k-means clustering can be applied to content items to partition the content items into k clusters in which each content item is assigned to a cluster with the nearest mean. Such existing approaches to clustering, however, may suffer from performance and/or accuracy issues when the number of content items being clustered is large. Given the popularity of content sharing on various websites and platforms, there exists a need for methods that are able to cluster a large amount of content items both quickly and efficiently.

SUMMARY

Various embodiments of the present disclosure can include systems, methods, and non-transitory computer readable media configured to obtain a first batch of content items to be clustered. A set of clusters can be generated by clustering respective binary hash codes for each content item in the first batch, wherein content items included in a cluster are visually similar to one another. A next batch of content items to be clustered can be obtained. One or more respective binary hash codes for the content items in the next batch can be assigned to a cluster in the set of clusters.

In an embodiment, obtaining the first batch of content items to be clustered further includes at least one of: determining that a threshold number of content items have been received or determining that a threshold period of time has elapsed.

In an embodiment, generating the set of clusters further includes generating a respective binary hash code for each content item in the first batch; selecting a set of cluster centers from the content items in the first batch, wherein each cluster center is associated with a respective binary hash code; determining, for each content item in the first batch, a corresponding cluster from the set of clusters; and determining an updated set of cluster centers for the set of clusters.

In an embodiment, determining, for each content item in the first batch, the corresponding cluster from the set of clusters further includes determining a nearest cluster center for each content item in the first batch; determining, for each content item in the first batch, a respective distance between the binary hash code for the content item and a binary hash code corresponding to the nearest cluster center for the content item; and assigning each content item in the first batch to a cluster corresponding to the nearest cluster center for the content item based at least in part on the respective distance satisfying a threshold.

In an embodiment, determining the nearest cluster center for each content item in the first batch further includes obtaining information describing the nearest cluster center for the content item using a multi-index hash table by hashing a binary hash code for the content item.

In an embodiment, for the set of clusters, at least one additional cluster can be generated by clustering the respective unassigned binary hash codes for the content items in the next batch.

In an embodiment, the method further includes removing, from each cluster in the set of clusters, content items in the cluster that are at least a threshold distance from a cluster center corresponding to the cluster.

In an embodiment, the method further includes removing, from the set of clusters, clusters that are smaller than a threshold size.

In an embodiment, assigning the one or more respective binary hash codes for the content items in the next batch to a cluster in the set of clusters further includes determining a nearest cluster center for each content item in the next batch; and determining, for each content item in the next batch, that a respective distance between the binary hash code for the content item and a binary hash code corresponding to the nearest cluster center for the content item satisfies a threshold.

In an embodiment, the method further includes determining that a content item is categorized as spam; determining a cluster in which the content item was clustered, the cluster including a plurality of other content items; and determining that the plurality of other content items in the cluster are spam.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
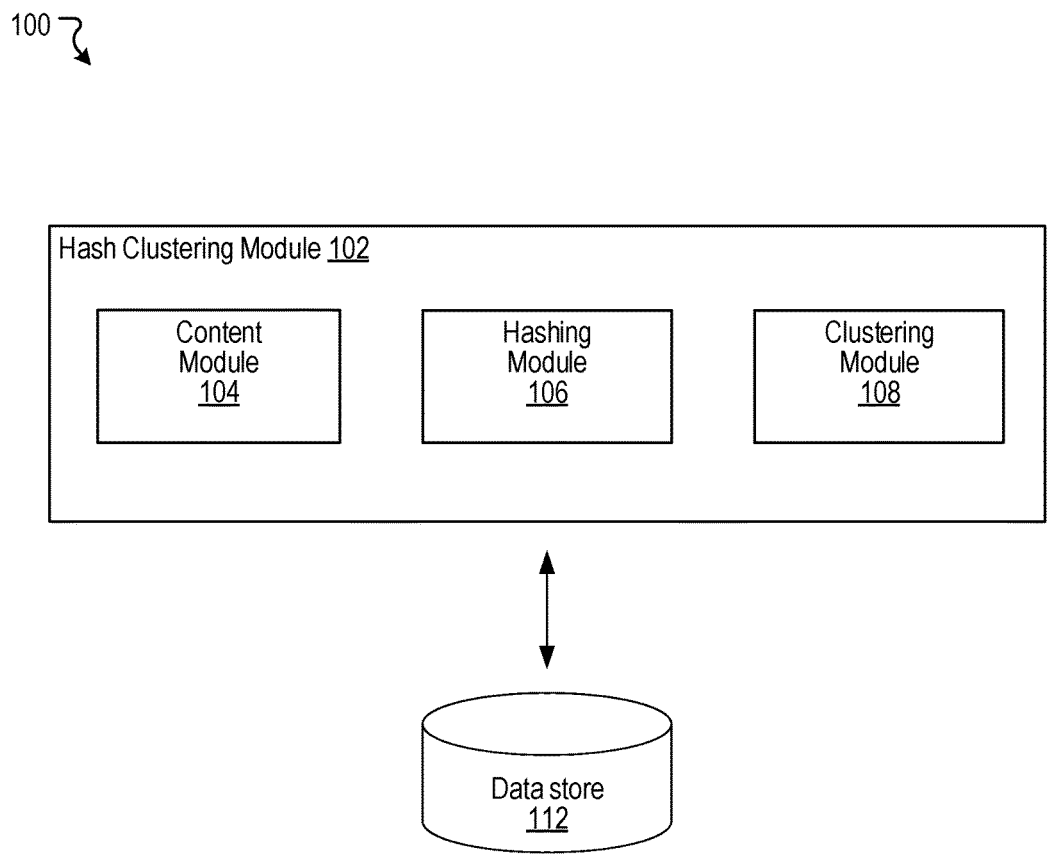
FIG. 1 illustrates an example system including an example hash clustering module configured to cluster content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Clustering Content Items

People use computing devices (or systems) for a wide variety of purposes. As mentioned, a user can operate a computing device to cluster content items, such as digital photographs or videos. Under conventional approaches, various clustering techniques can be applied to collections of content items (e.g., images or videos) in an effort to organize such content items based on their similarity to one another, for example. As mentioned, existing approaches to clustering, however, may suffer from performance and/or accuracy issues when the number of content items being clustered is large or when the content items are received in a continuous stream.

An improved approach overcomes the foregoing and other disadvantages associated with conventional approaches. In general, a similarity-preserving hash can be generated for each content item to be clustered. In various embodiments, the similarity-preserving hash is a binary hash code. Thus, unlike conventional approaches in which content items are represented using floating point numbers, the improved approach represents the content items in binary. A binary k-means (Bk-means) clustering approach can be applied to the binary hash codes corresponding to the content items to be clustered. The binary k-means clustering approach can be configured to constrain the respective cluster centers to be in binary form. A multi-index hash table can be generated to store the respective binary cluster centers. This index can be utilized to efficiently look up the nearest binary cluster center for any binary hash code. In some embodiments, the nearest cluster center can be determined based on a distance threshold. In various embodiments, by utilizing the multi-index hash table, the time complexity of the traditional k-means clustering can be reduced from $O(nk)$ to $O(n)$, assuming n data points and k centers. Further, by utilizing compact binary hash codes, the space needed to store information about the cluster centers can be reduced significantly.

Such improved approaches can be applied to implement online clustering of a stream of content items. In various embodiments, a first batch of content items received over a period of time can be clustered using the Bk-means clustering approach. Content items included in clusters that are not visually consistent with other content items in the clusters within a threshold degree can be removed. Content item clusters that are smaller than a threshold size can also be removed. When a second batch of content items is received, content items in the second batch can be assigned to existing clusters based on a threshold distance (e.g., Hamming distance) between the respective binary hash codes of the content items and the respective binary hash codes corresponding to the cluster centers. The Bk-means clustering approach can be applied to the remaining content items that were not assigned to the existing clusters. As described above, the improved approach can remove the clustered content items in the second batch that are not visually consistent with other content items in the clusters within a threshold degree. Further, clusters that are smaller than a threshold size can also be removed. By utilizing such an approach, incoming data streams of content items can be clustered optimally and quickly. Such online-based clustering of content items can be used for a variety of purposes including, for example, identifying content items that are spam, identifying time-sensitive content item clusters, and trending events or content items.

FIG. 1 illustrates an example system 100 including an example hash clustering module 102 configured to cluster content items, according to an embodiment of the present disclosure. As shown in the example of FIG. 1, the hash clustering module 102 can include a content module 104, a hashing module 106, and a clustering module 108. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the hash clustering module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the hash clustering module 102 can be implemented, in part or in whole, as software running on one or more computing devices or systems, such as on a user- or client computing device. For example, the hash clustering module 102, or at least a portion thereof, can be implemented as or within an application (e.g., app), a program, or an applet, etc., running on a user computing device or a client computing system, such as the user device 710 of FIG. 7. Further, the hash clustering module 102, or at least a portion thereof, can be implemented using one or more computing devices or systems that include one or more servers, such as network servers or cloud servers. In some instances, the hash clustering module 102 can, in part or in whole, be implemented within or configured to operate in conjunction with a social networking system (or service), such as the social networking system 730 of FIG. 7. It should be understood that there can be many variations or other possibilities.

In some embodiments, the hash clustering module 102 can be configured to cluster content items, such as content items provided in a data stream, for example. The stream of content items may be a result of users uploading various content items to be shared with other users of a social networking system. In various embodiments, the hash clustering module 102 can obtain and cluster such content items using the approaches described in this disclosure. As more content items are provided, the hash clustering module 102 can continue to obtain and cluster the new content items. As a result, the hash clustering module 102 can generate clusters of visually similar content items on an on-going basis without requiring that all content items to be clustered be identified in advance.

In some instances, the content module 104 can receive, or obtain, content items to be clustered. The content items can be, for example, images or videos. These content items may be included in a repository of content items (e.g., the data store 112) to be clustered. For example, the content items to be clustered may have been uploaded by various users of a system, such as a social networking system. In various embodiments, the content items to be clustered can be provided as a stream. In such embodiments, the content module 104 can obtain batches of content items to be clustered on an on-going basis. For example, as soon as a batch of content items is received, the hash clustering module 102 can cluster content items included in the batch. Similarly, once a new batch of content items is received, the hash clustering module 102 can cluster content items included in the new batch. Depending on the implementation, a batch of content items may correspond to a threshold number of content items or content items that were received over a threshold period of time.

The hashing module 106 can be configured to generate a respective hash for each content item. In various embodiments, the generated hash can be a similarity-preserving binary hash code that provides a compact representation of the content item. The hashing module 106 can also be configured to generate a multi-index hash table that indexes the cluster centers. The cluster centers corresponding to each cluster can also each be represented as a binary hash code.

The clustering module 108 can be configured to cluster the content items into clusters of similar content items. In various embodiments, the clustering module 108 can cluster the respective similarity-preserving binary hash codes that correspond to the content items. The clustering module 108 can also be configured to perform online clustering of content item streams. More details regarding the hashing module 106 and the clustering module 108 will be provided below in reference to FIG. 2 and FIG. 3, respectively.

In some embodiments, the hash clustering module 102 can be configured to communicate and/or operate with the at least one data store 112, as shown in the example system 100. The at least one data store 112 can be configured to store and maintain various types of data. In various embodiments, the at least one data store 112 can store various information associated with the hash clustering module 102, such as content items (e.g., images or videos) to be clustered, similarity-preserving binary hash codes associated with the content items, and binary hash codes associated with cluster centers, a multi-index hash table, etc. In some implementations, the at least one data store 112 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

Figure 2:
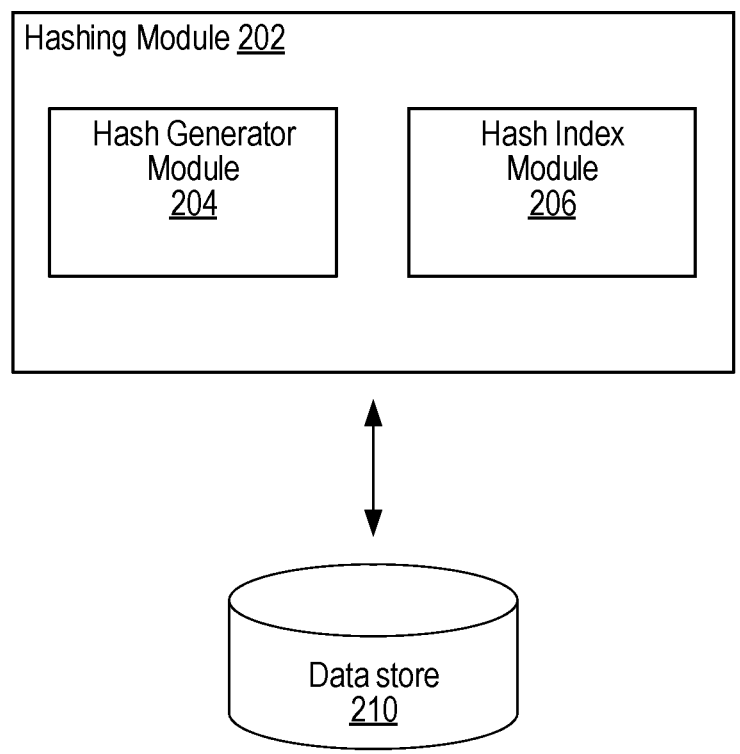
FIG. 2 illustrates an example hashing module configured to generate binary hashes of content items, according to an embodiment of the present disclosure.

FIG. 2 illustrates an example hashing module 202 configured to generate binary hashes of content items, according to an embodiment of the present disclosure. In some embodiments, the hashing module 106 of FIG. 1 can be implemented with the hashing module 202. As shown in the example of FIG. 2, the hashing module 202 can include a hash generator module 204 and a hash index module 206.

The hash generator module 204 can be configured to generate respective similarity-preserving binary hash codes for content items, such as content items stored on a data store 210. In various embodiments, the hash generator module 204 can generate respective similarity-preserving binary hash codes for each content item in a batch, or set, of content items that are received. Each binary hash code can be of a specified length (e.g., 128 bits or 256 bits). In various embodiments, a binary hash code string may be represented using zeros (0) and ones (1) or using ones (1) and negative ones (−1).

Some example hashing approaches include spectral hashing (Y. Weiss, A. Torralba, and R. Fergus "Spectral Hashing," *Neural Information Processing Systems* (*NIPS*), 2008), iterative quantization (Y. Gong, S. Lazebnik, A. Gordo, and F. Perronnin "Iterative quantization: A Procrustean approach to learning binary hash codes for large-scale image retrieval," *Pattern Analysis and Machine Intelligence* (*PAMI*), 2012), minimal loss hashing (M. Norouzi and D. J. Fleet "Minimal loss hashing for compact binary hash codes," *International Conference on Machine Learning* (*ICML*), 2011), graph hashing (W. Liu, S. Kumar, and S.-F. Chang "Hashing with graphs," *International Conference on Machine Learning* (*ICML*), 2011 and W. Liu, J. Wang, R. Ji. Y.-G. Jiang, and S.-F. Chang "Supervised hashing with kernels," *Computer Vision and Pattern Recognition* (*CVPR*), 2012), semi-supervised hashing (J. Wang, S. Kumar, and S.-F. Chang "Semi-supervised hashing for scalable image retrieval," *Computer Vision and Pattern Recognition* (*CVPR*), 2010), product quantization (H. Jegou, M. Douze, and C. Schmid "Product quantization for nearest neighbor search," *IEEE Transactions on Pattern Analysis and Machine Intelligence* (*IEEE TPAMI*), 2011), optimized product quantization (T. Ge, K. He, Q. Ke, and J. Sun "Optimized product quantization," *Pattern Analysis and Machine Intelligence* (*PAMI*), 2014), k-means hashing (K. He, F. Wen, and J. Sun "K-means hashing: an affinity-preserving quantization method for learning binary compact codes," *Computer Vision and Pattern Recognition* (*CVPR*), 2013), and Cartesian k-means (M. Norouzi and D. Fleet "Cartesian kmeans," *Computer Vision and Pattern Recognition* (*CVPR*), 2013), all of which are incorporated herein by reference.

The hash index module 206 can be configured to build multi-index hash tables for indexing information describing cluster centers. For example, respective binary hash codes corresponding to each cluster center can be indexed in the multi-index hash table. The multi-index hash table can be utilized to look up the nearest center for any binary hash code. One example approach for building multi-index hash tables is described in M. Norouzi, A. Punjani, and D. J. Fleet "Fast Search in hamming space with multi-index hashing," *Computer Vision and Pattern Recognition* (*CVPR*), 2012, which is incorporated herein by reference.

Figure 3:
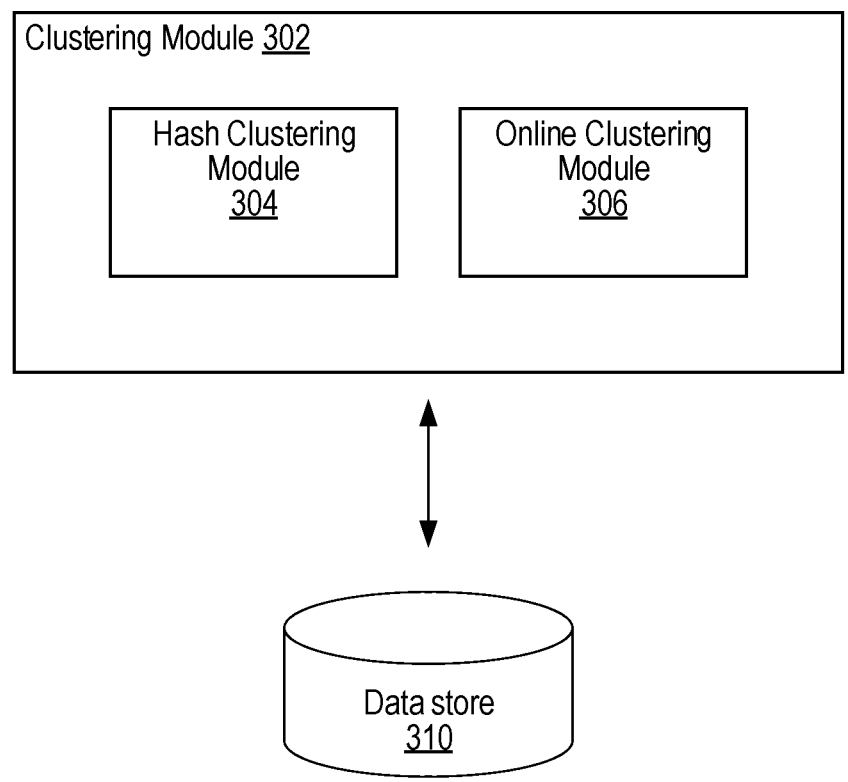
FIG. 3 illustrates an example clustering module configured to cluster binary hashes, according to an embodiment of the present disclosure.

FIG. 3 illustrates an example clustering module 302 configured to cluster binary hashes, according to an embodiment of the present disclosure. In some embodiments, the clustering module 108 of FIG. 1 can be implemented with the clustering module 302. As shown in the example of FIG. 3, the clustering module 302 can include a hash clustering module 304 and an online clustering module 306.

The clustering module 302 can be configured to cluster binary hash codes that were generated, for example, by the hash generator module 204 of FIG. 2. In various embodiments, the clustering module 302 can be configured to cluster the binary hash codes using a binary k-means (Bk-means) method. The Bk-means approach is similar to the traditional k-means clustering approach except that Bk-means utilizes a constrained k-means formulation that constrains the means to be binary. Thus, unlike traditional k-means, the Bk-means approach adds a binary constraint to the cluster centers. By utilizing and indexing binary hash codes in the multi-index hash table, the clustering module 302 can efficiently look up the nearest center for any binary hash code corresponding to a content item as well as efficiently measure a distance between any two binary hash codes.

In various embodiments, for a first batch, or set, of binary hash codes that correspond to content items, the clustering module 302 can apply the Bk-means method by randomly selecting a set of cluster centers. As mentioned, the cluster centers are represented as binary hash codes. The number of cluster centers selected can be based on the number of clusters to be generated (i.e., k). Next, the clustering module 302 can utilize the hash index module 206 of FIG. 2 to insert the randomly selected cluster centers into the multi-index hash table. The clustering module 302 can then utilize the multi-index hash table to look up the nearest cluster center for each binary hash code in the batch. The binary hash codes are then assigned to a corresponding cluster based on the respective cluster center that is nearest to the binary hash code. In some embodiments, the binary hash codes are assigned to a nearest cluster center that is within a threshold distance (e.g., distance of 30, 40, 50, etc.).

Once the binary hash codes have been assigned to their corresponding clusters, the clustering module 302 can update the cluster centers for each of the clusters. For example, for each cluster, the clustering module 302 can compute a mean for all points assigned to the cluster. The cluster center for each cluster can be updated by determining the respective mean for the cluster and taking the sign of it.

For each subsequent clustering iteration, the clustering module 302 can continue to apply the Bk-means method by updating the multi-index hash table to reflect the updated cluster centers for each cluster. The multi-index hash table can be utilized to look up the nearest cluster center for each binary hash code in the batch. The binary hash codes are again assigned to a corresponding cluster based on the respective cluster center that is nearest to the binary hash code. Similarly, once the binary hash codes have been assigned to their corresponding clusters, the clustering module 302 can update the cluster centers for each of the clusters, as described above. The number of iterations performed can be pre-defined and can vary depending on the implementation.

As mentioned, in some instances, it may be advantageous to cluster content items that are provided as part of a data stream. A stream of content items generally refers to a sequence, or series, or content items that are continuously being received. In one example, a stream of content items can be provided by users that are continuously uploading content items to share through a social networking system.

In various embodiments, the online clustering module 306 can be configured to perform clustering of content items that are provided in a data stream. For example, content items provided in the stream can be stored in a data store, e.g., the data store 310. The data store can be a fixed-size cache, such as a Least Recently Used (LRU) cache. In some embodiments, once a threshold number of content items are stored in the data store, the Bk-means method can be performed on the content items in the data store. In some embodiments, the Bk-means method is performed once a threshold amount of time has elapsed. Before clustering, a respective binary hash code is generated for each of the content items, as described above. When clustering the content items, the number of clusters that are generated can be based on a pre-defined value. In some embodiments, the number of clusters is determined based at least in part on the threshold number of content times being clustered. For example, assuming that n content items are to be clustered, then the number of clusters to be generated can be, for example, $$\frac{n}{5}, \frac{n}{10}, \frac{n}{15},$$

etc. The threshold number of content items, n, can vary depending on the implementation. In some embodiments, the threshold number, n, can be 500,000, 750,000, 1,000,000, to provide some examples.

For each cluster, the online clustering module 306 can filter out any content items that are not visually consistent, or similar, with other content items in that cluster. For example, the online clustering module 306 can determine respective distances between the binary hash code of each content item in a cluster and the corresponding binary hash code for the cluster center. The content items in the cluster that are a threshold distance or greater from the cluster center can be removed, or discarded. In some embodiments, the distance between a content item and the cluster center is determined using Hamming distance. For example, to compute a distance between a content item and a cluster center, the clustering module 306 can compute a Hamming distance between the binary hash code corresponding to the content item and the binary hash code corresponding to the cluster center. In one example, a Hamming distance for a binary hash code of "1110" and a cluster center of "0010" is 2, since there are two bits that are different between the two binary hash codes. The threshold distance, r, used for filtering can vary depending on the implementation. In some embodiments, the threshold distance, r, can be 5, 6, 7, 8, 9, or 10, to provide some examples.

Once filtering is complete, the online clustering module 306 can also remove, or discard, any clusters that are smaller than a threshold size t. Naturally, the threshold size used for removing clusters can vary depending on the implementation. In some embodiments, the threshold size, t, can be 5, 6, 7, 8, 9, or 10, to provide some examples.

While the online clustering module 306 is clustering the first batch of content items, another batch of content items can be received and stored in the data store. The online clustering module 306 can be configured to continue clustering subsequent batches of content items. For example, for each new batch, the online clustering module 306 can assign each new content item to an existing cluster. This assignment can be made by determining respective distances between the binary hash code of the new content item and the binary hash codes of each of the cluster centers. The content item can be assigned to a cluster when the distance between the binary hash code of the content item and the binary hash code of the center corresponding to the cluster is within a threshold distance. As mentioned, the threshold distance, r, can vary depending on the implementation. In some embodiments, the threshold distance, r, can be 5, 6, 7, 8, 9, or 10, to provide some examples.

The online clustering module 306 can cluster any remaining content items that were not assigned to an existing cluster using the approach described above. For example, the online clustering module 306 can cluster the content items using the Bk-means method. For each cluster, the online clustering module 306 can filter out any content items that are not visually consistent, or similar, with other content items in that cluster. Once filtering is complete, the online clustering module 306 can also remove any clusters that are smaller than a threshold size t.

In various embodiments, the approaches described above can be implemented to identify clusters of content items that can be categorized as spam or to identify clusters of content items that are trending, for example.

Figure 4:
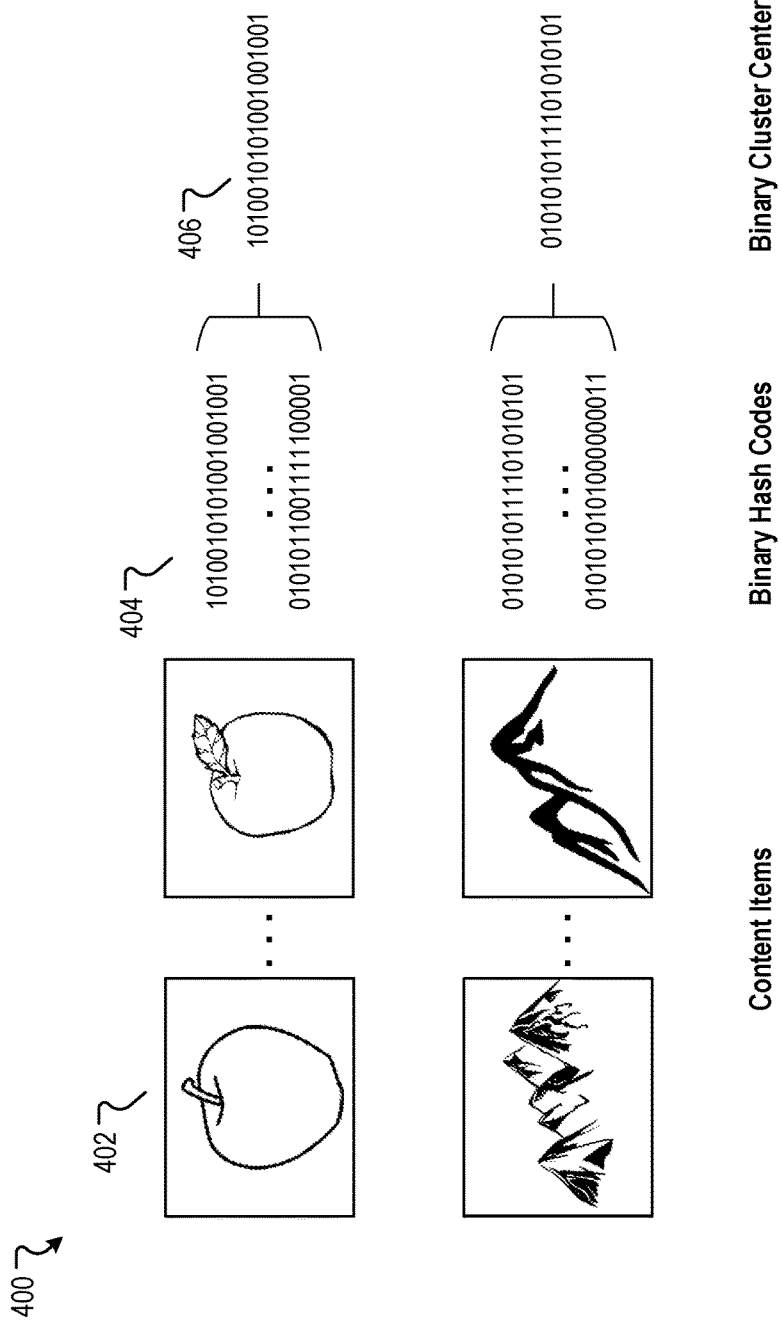
FIG. 4 illustrates an example diagram showing the clustering of content items, according to various embodiments of the present disclosure.

FIG. 4 illustrates an example diagram 400 showing the clustering of content items 402, according to various embodiments of the present disclosure. The example diagram 400 illustrates a scenario of batch of content items (e.g., images) 402 to be clustered using the approaches described in this disclosure. As mentioned, a respective similarity-preserving binary hash code 404 can be generated for each content item 402 to be clustered. The binary hash codes 404 are merely illustrative. The binary hash codes 404 for the content items 402 can be clustered, as described above. Each cluster can have a corresponding cluster center that is represented as a binary hash code 406. The binary hash code 406 is merely illustrative. By utilizing binary hash codes, the content items can be clustered using the binary k-means (Bk-means) approach described above. Further, by utilizing binary hash codes 406, the space needed to store information describing the cluster centers, for example, in the multi-index hash table, can be reduced.

Figure 5:
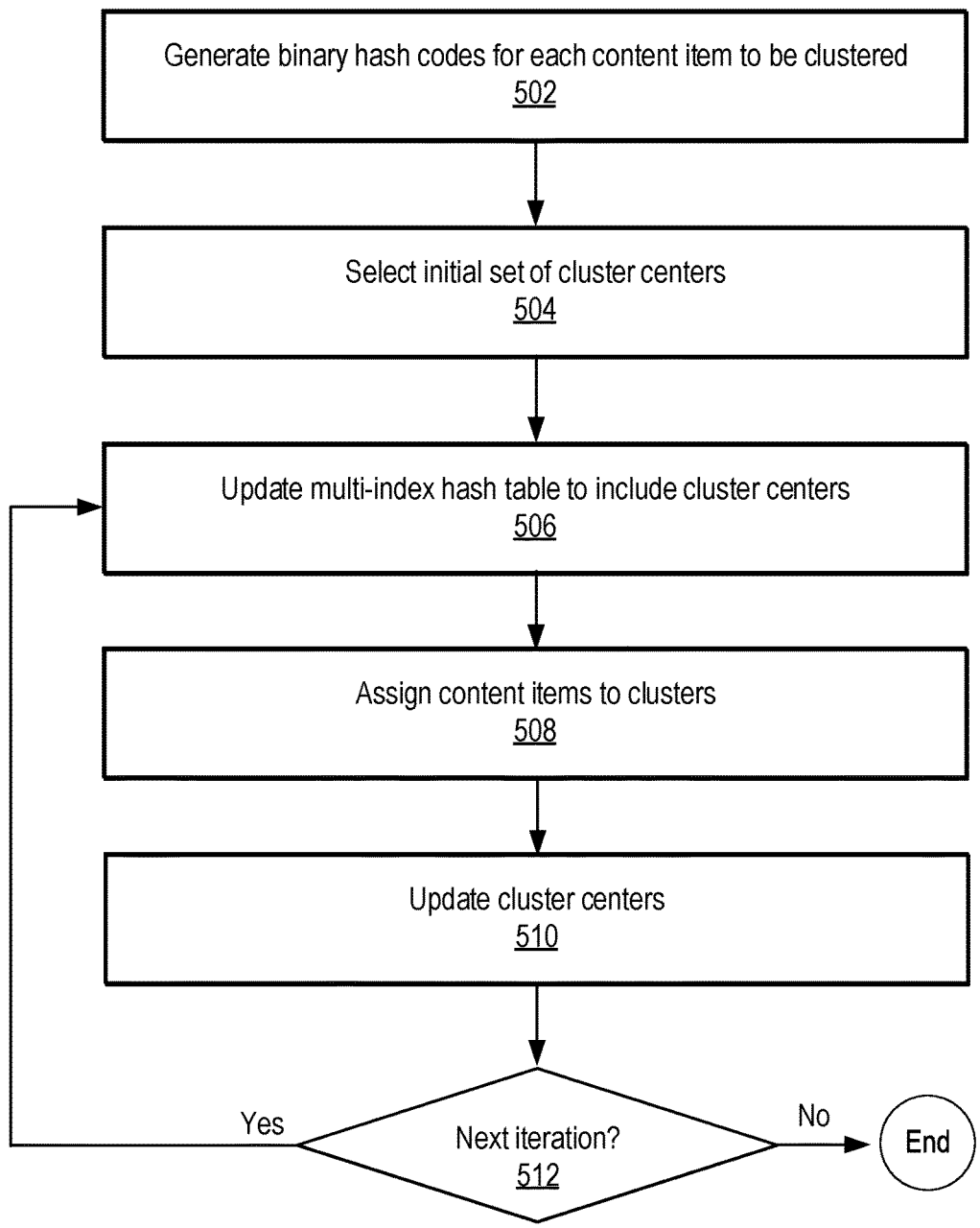
FIG. 5 illustrates an example method for clustering binary hashes, according to an embodiment of the present disclosure.

FIG. 5 illustrates an example method 500 for clustering binary hashes, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can generate binary hash codes for each content item to be clustered. In various embodiments, the binary hash codes of the content items can be clustered using the binary k-means (Bk-means) method, as described above. At block 504, the method 500 can randomly select an initial set of cluster centers from the binary hash codes corresponding to the content items. The number of cluster centers selected can be based on the number of clusters to be generated (i.e., k). At block 506, the method 500 can update a multi-index hash table by inserting the binary hash codes of the randomly selected cluster centers into the multi-index hash table. As mentioned, the multi-index hash table can be used to look up the nearest cluster center for a binary hash code. At block 508, the method 500 can assign each binary hash code corresponding to the content items to a cluster. For example, the multi-index hash table can be utilized to look up the nearest cluster center for a binary hash code. The binary hash code can then be assigned to the cluster that corresponds to that cluster center. Once the binary hash codes have been assigned to their corresponding clusters, at block 510, the method 500 can update the cluster centers for each of the clusters, as described above. At block 512, a determination can be made whether to perform another iteration of the Bk-means clustering method on the content items. The number of iterations performed can be pre-defined and can vary depending on the implementation. In one example, the number of iterations performed can be 3, 4, or 5, to provide some examples. If a determination is made to perform another clustering iteration, the method 500 proceeds to block 506. Otherwise, the method 500 ends.

Figure 6:
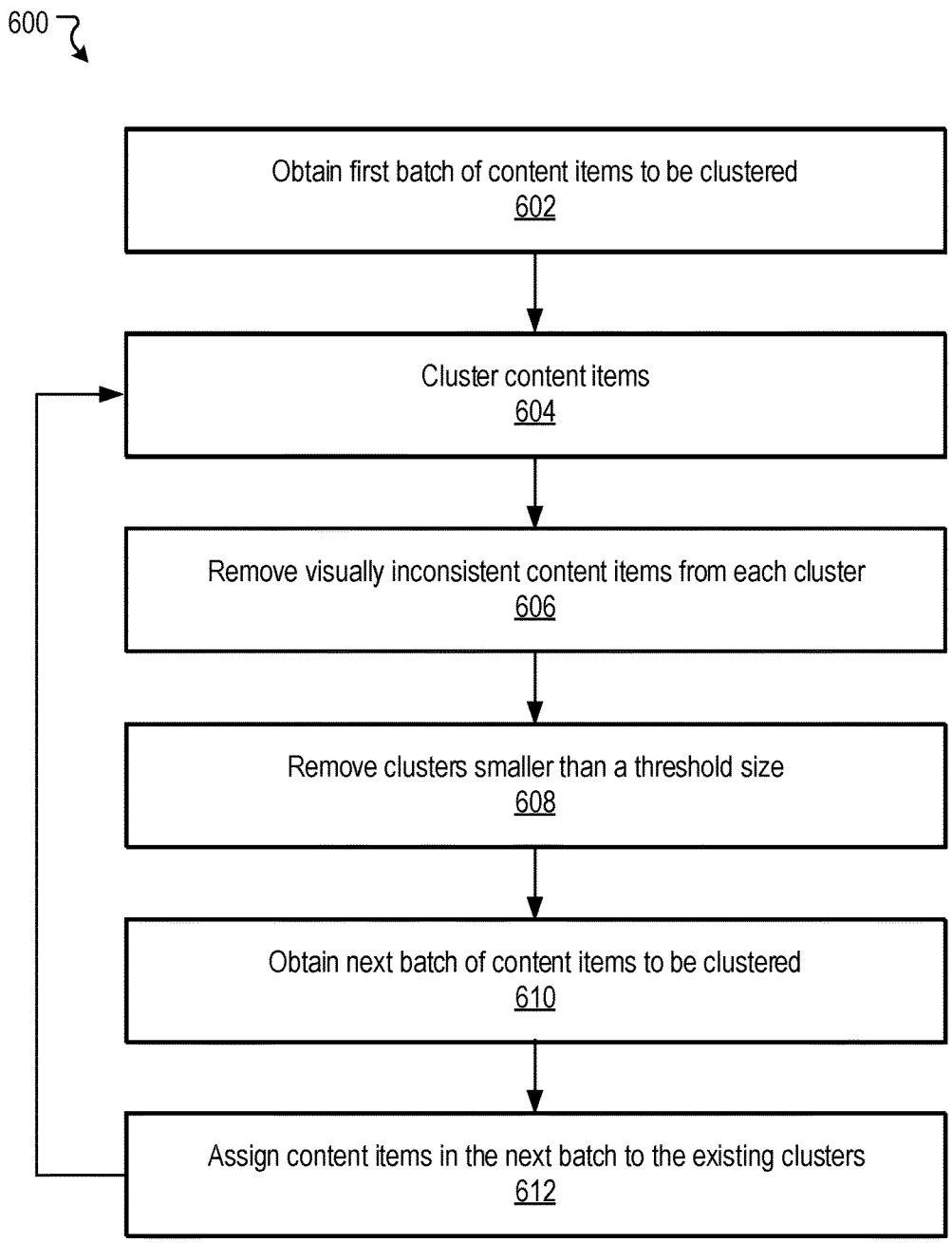
FIG. 6 illustrates an example method for clustering a stream of content items, according to an embodiment of the present disclosure.

FIG. 6 illustrates an example method 600 for clustering a stream of content items, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can obtain a first batch of content items to be clustered. At block 604, the method 600 can cluster the content items. The content items can be clustered, for example, using the Bk-means clustering method. At block 606, the method 600 can remove, from each cluster, any visually inconsistent content items that were included in the cluster. At block 608, the method 600 can remove any clusters that are smaller than a threshold size. That is, any clusters that include a number of content items that is less than the threshold size can be deleted. At block 610, the method 600 can obtain the next batch of content items to be clustered. For example, the next batch can include new content items that were uploaded subsequent to the first batch of content items. At block 612, the method 600 can assign each new content item to an existing cluster. In some embodiments, this assignment can be made by determining respective distances between the binary hash code of the content item and the binary hash codes of each of the cluster centers. The content item can be assigned to a cluster when the distance between the binary hash code of the content item and the binary hash code of the center corresponding to the cluster is within a threshold distance. In some embodiments, the assignment can be made by utilizing a multi-index hash table to look up a nearest cluster center for a binary hash code and assigning the binary hash code to that cluster if the distance between the nearest cluster center and the binary hash code is within a threshold distance. The method 600 can cluster any content items that were not assigned to an existing cluster. Similarly, for each cluster, the method 600 can filter out any content items that are not visually consistent, or similar, with other content items in that cluster. The method 600 can also remove any clusters that are smaller than a threshold size. Further, the method 600 can be repeated to cluster subsequent batches of content items.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
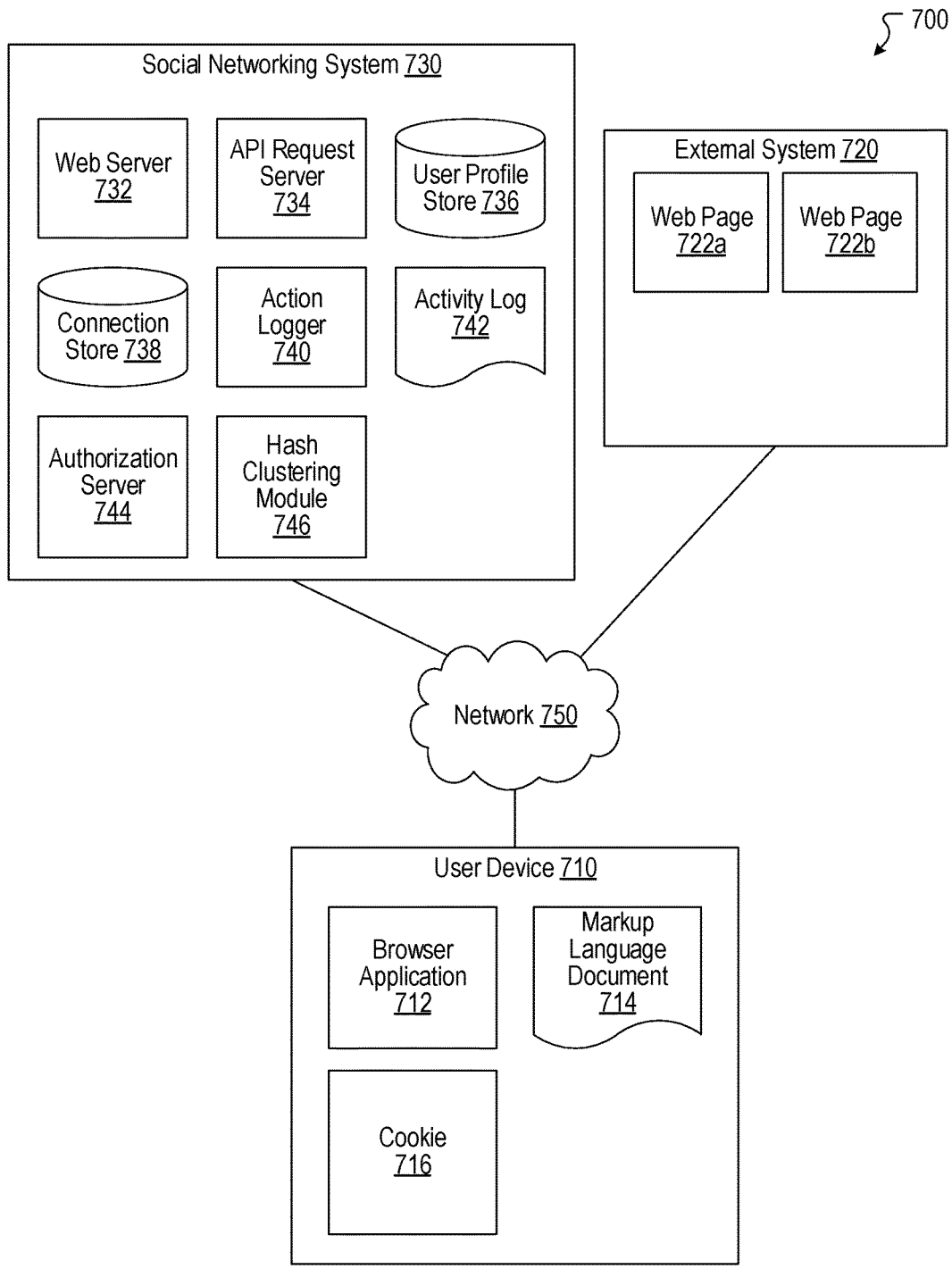
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a hash clustering module 746. The hash clustering module 746 can, for example, be implemented as the hash clustering module 102 of FIG. 1. In some embodiments, the user device 710 can include the hash clustering module. As discussed previously, it should be appreciated that there can be many variations or other possibilities.

Hardware Implementation

Figure 8:
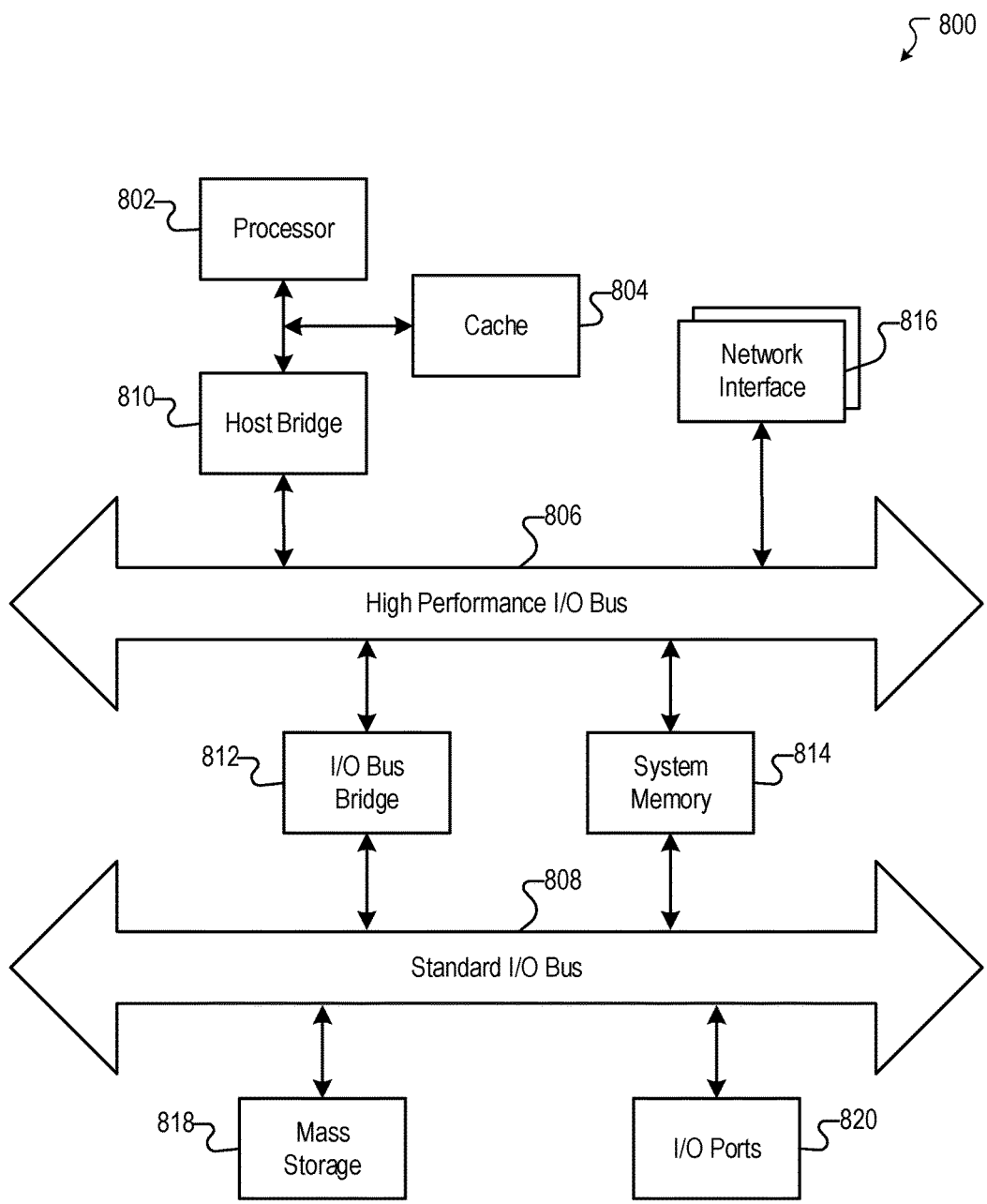
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, a first batch of content items to be clustered;
   selecting, by the computing system, a set of the first batch of content items to be a set of cluster centers;
   inserting, by the computing system, cluster center binary hash codes of the set of cluster centers into a multi-index hash table;
   generating, by the computing system, a set of clusters of visually similar content items in the first batch of content items based at least in part on first binary hash codes associated with the first batch of content items, wherein the generating is based on an assignment of a content item of the first batch of content items to a nearest cluster center based on a look up of a nearest cluster center binary hash code in the multi-index hash table;
   updating, by the computing system, the cluster center binary hash codes based on means of the first binary hash codes;

obtaining, by the computing system, a second batch of content items to be clustered;

assigning, by the computing system, at least a portion of second binary hash codes associated with the second batch of content items to clusters in the set of clusters based on distances between the second binary hash codes and cluster centers in the set of clusters; and generating, by the computing system, at least one new cluster based on unassigned second binary hash codes that are within a threshold distance to each other.

2. The computer-implemented method of claim 1, wherein obtaining, by the computing system, the first batch of content items to be clustered further comprises at least one of:

determining that a threshold number of content items have been received, or determining that a threshold period of time has elapsed.

3. The computer-implemented method of claim 1, wherein generating, by the computing system, the set of clusters further comprises:

generating the first binary hash codes associated with the first batch of content items; and determining, for each content item in the first batch of content items, a corresponding cluster from the set of clusters based on the look up of the nearest cluster center binary hash code in the multi-index hash table.

4. The computer-implemented method of claim 3, wherein determining, for each content item in the first batch of content items, the corresponding cluster from the set of clusters further comprises:

determining, for each content item in the first batch of content items, a respective distance between the first binary hash code for the content item and the nearest cluster center for the content item; and assigning each content item in the first batch of content items to the nearest cluster center for the content item based at least in part on the respective distance satisfying a threshold.

5. The computer-implemented method of claim 1, wherein the set of cluster centers are randomly selected.

6. The computer-implemented method of claim 1, wherein the set of clusters of visually similar content items is generated further based at least in part on a binary k-means clustering approach.

7. The computer-implemented method of claim 1, the method further comprising:

removing, from each cluster in the set of clusters, content items in the cluster that are at least a threshold distance from a cluster center corresponding to the cluster.

8. The computer-implemented method of claim 1, the method further comprising:

removing, from the set of clusters, clusters that are smaller than a threshold size.

9. The computer-implemented method of claim 1, wherein assigning, by the computing system, the at least the portion of the second binary hash codes associated with the second batch of content items further comprises:

determining a nearest cluster center for each content item in the second batch of content items; and determining, for each content item in the second batch of content items, that a respective distance between the second binary hash code for the content item and a binary hash code corresponding to the nearest cluster center for the content item satisfies a threshold.

10. The computer-implemented method of claim 1, the method further comprising:

determining that a content item is categorized as spam;

determining a cluster in which the content item was clustered, the cluster including a plurality of other content items; and determining that the plurality of other content items in the cluster are spam.

11. A system comprising:

at least one processor; and a memory storing instructions that, when executed by the at least one processor, cause the system to perform:

obtaining a first batch of content items to be clustered;

selecting a set of the first batch of content items to be a set of cluster centers;

inserting cluster center binary hash codes of the set of cluster centers into a multi-index hash table;

generating a set of clusters of visually similar content items in the first batch of content items based at least in part on first binary hash codes associated with the first batch of content items, wherein the generating is based on an assignment of a content item of the first batch of content items to a nearest cluster center based on a look up of a nearest cluster center binary hash code in the multi-index hash table;

updating the cluster center binary hash codes based on means of the first binary hash codes;

obtaining a second batch of content items to be clustered;

assigning at least a portion of secondary binary hash codes associated with the second batch of content items of clusters in the set of clusters based on distances between the second binary hash codes and cluster centers in the set of clusters; and generating at least one new cluster based on unassigned second binary hash codes that are within a threshold distance to each other.

12. The system of claim 11, wherein obtaining the first batch of content items to be clustered further comprises at least one of:

determining that a threshold number of content items have been received, or determining that a threshold period of time has elapsed.

13. The system of claim 11, wherein generating the set of clusters further comprises:

generating the first binary hash codes associated with the first batch of content items; and determining, for each content item in the first batch of content items, a corresponding cluster from the set of clusters based on the look up of the nearest cluster center binary hash code in the multi-index hash table.

14. The system of claim 13, wherein determining, for each content item in the first batch of content items, the corresponding cluster from the set of clusters further comprises:

determining, for each content item in the first batch of content items, a respective distance between the first binary hash code for the content item and the nearest cluster center for the content item; and assigning each content item in the first batch of content items to the nearest cluster center for the content item based at least in part on the respective distance satisfying a threshold.

15. The system of claim 11, wherein the set of cluster centers are randomly selected.

16. A non-transitory computer-readable storage medium including instructions that, when executed by at least one processor of a computing system, cause the computing system to perform a method comprising:

obtaining a first batch of content items to be clustered;

selecting a set of the first batch of content items to be a set of cluster centers;
inserting cluster center binary hash codes of the set of cluster centers into a multi-index hash table;
generating a set of clusters of visually similar content items in the first batch of content items based at least in part on first binary hash codes associated with the first batch of content items, wherein the generating is based on an assignment of a content item of the first batch of content items to a nearest cluster center based on a look up of a nearest cluster center binary hash code in the multi-index hash table;
updating the cluster center binary hash codes based on means of the first binary hash codes;
obtaining a second batch of content items to be clustered;
assigning at least a portion of second binary hash codes associated with the second batch of content items to clusters in the set of clusters based on distances between the second binary hash codes and cluster centers in the set of clusters; and
generating at least one new cluster based on unassigned second binary hash codes that are within a threshold distance to each other.

17. The non-transitory computer-readable storage medium of claim 16, wherein obtaining the first batch of content items to be clustered further comprises at least one of:

determining that a threshold number of content items have been received, or
determining that a threshold period of time has elapsed.

18. The non-transitory computer-readable storage medium of claim 16, wherein generating the set of clusters further comprises:

generating the first binary hash codes associated with the first batch of content items; and
determining, for each content item in the first batch of content items, a corresponding cluster from the set of clusters based on the look up of the nearest cluster center binary hash code in the multi-index hash table.

19. The non-transitory computer-readable storage medium of claim 18, wherein determining, for each content item in the first batch of content items, the corresponding cluster from the set of clusters further comprises:

determining, for each content item in the first batch of content items, a respective distance between the first binary hash code for the content item and the nearest cluster center for the content item; and
assigning each content item in the first batch of content items to the nearest cluster center for the content item based at least in part on the respective distance satisfying a threshold.

20. The non-transitory computer-readable storage medium of claim 16, wherein the set of cluster centers are randomly selected.

* * * * *